United States Patent [19]
Lahm

[11] 3,727,493
[45] Apr. 17, 1973

[54] METHOD AND APPARATUS FOR SETTING A TOOL OF A MACHINE TOOL

[75] Inventor: Heinrich Lahm, Esslingen, N.-Sirnau, Germany

[73] Assignee: Index-Werke KG Hahn & Tessky, Esslingen/Neckar, Germany

[22] Filed: Sept. 1, 1970

[21] Appl. No.: 68,653

[30] Foreign Application Priority Data

Sept. 5, 1969 Germany.................P 19 45 017.0

[52] U.S. Cl.............82/1 C, 82/2 B, 82/21 B, 318/572
[51] Int. Cl.....................B23b 1/00, B23b 7/00
[58] Field of Search............82/2 B, 1 C, 21 B; 318/572

[56] References Cited

UNITED STATES PATENTS 3,350,966  11/1967  Moulton.............................82/2 B
3,481,247  12/1969  Hayes.................................82/2 B

*Primary Examiner*—Leonidas Vlachos
*Attorney*—Michael S. Striker

[57] ABSTRACT

A program controlled tool of a machine tool is moved in a setting operation in two perpendicular directions to a reference position in which a cutting point thereof is located in the line of intersection of two perpendicular planes which are perpendicular to two directions, respectively in which the cutting point is moved. Data representing the setting movements of the tool are stored in program controlled means, and when the cutting point is located in the reference line, a signal is transmitted by sensing means to the program control means so that consequent working movements of the tool can be program controlled with reference to the line of intersection.

20 Claims, 2 Drawing Figures

METHOD AND APPARATUS FOR SETTING A TOOL OF A MACHINE TOOL

BACKGROUND OF THE INVENTION

The present invention relates to machine tools of the type in which working operations of a tool mounted on a tool carrier, are controlled in accordance with a program stored in program controlled means.

Program controlled machine tools require a presetting of the tools, which can be carried out by a special device. Due to the presetting of the tool or tools, the programmer can relate the working movement to a fixed point of the machine while programming the program controlled means. In this manner, it is possible to determine the required movements mathematically exact.

However, between the presetting devices and the machine tool, the actual measurements vary from the desired measurements as represented by the drawing. These deviations are caused by the finishing tolerances of the adjusting and clamping means of the tool holder, by the precision of the presetting device, and by the precision of the adjustment of the tools in the tool holder. Due to these conditions, the measurements of the workpiece cannot be particularly exact. For more precise measurements, it is necessary to provide a possibility for correcting the programmed tools. It is possible to introduce correction data into the storing device of the program controlled means by manual operation, and the required data are obtained by measuring the first finished workpiece. However, when another workpiece is provided, the correction is again necessary.

In order to eliminate the making of a sample workpiece, or the measuring of workpiece dimensions, a device is known which is fixedly secured to the machine, and permits the reading out of the required corrections. The device indicates inaccuracies of the presetting operation by means of a measuring instrument showing the deviation of the actual measurement from the desired measurement. Such deviation must then be corrected in the program controlled means.

In accordance with another known method for automatically presetting a tool, a presetting device is replaced by a program controlled carriage unit. The tool is placed in a programmed position, and then manually adjusted in the tool holder with reference to a feeler, and then clamped in the adjusted position. In the clamped condition, the control instrument should not show any deviations of the actual position from the desired position of the tools. In such an arrangement, a displacement of the cutting tool edge relative to a desired position is found by means of an indicating measuring instrument, whereupon a corresponding correction value is introduced into the program controlled means. In all known apparatus and methods for presetting a tool accurately, it is necessary to preset the tool, and then correct the position of the same.

SUMMARY OF THE INVENTION

It is one object of the present invention to overcome the disadvantages of known presetting devices for the tools of a machine tool, and to automatically set a tool, and correct the position of the same.

Another object of the invention is to determine a fixed reference point for a cutting point of the tool during a setting operation, and to control the working movements of the tool by program controlled means in accordance with the program which is based on the fixed reference point.

Another object of the invention is to select a reference point which is located in the axis of the workpiece.

With these objects in view, the present invention provides a method in which a tool carrier is displaced until a cutting point of the tool is located in a predetermined plane which is fixed relative to the machine, or in a predetermined reference line or point which are also fixed relative to the machine. The setting movements of the tool carrier are stored so that the data by which the consequent working movements of the tool are controlled, can be related to the reference plane, or to the reference line or point, respectively. In accordance with the invention, for each tool first a common starting plane, line or point is determined to which the working motions of the tool, which are to be programmed, are related.

As a result, the present invention not only eliminates a presetting of the tools, but also the difficult calculations of the position of the tool edges or points upon switching to another tool on the same turret. In the method of the invention, the distances through which the tools move during the setting, are stored in the storage device of the program controlled means. Such a storage can become again effective, if the same tool is again to be used during a later operation. This means that during each change of tools, the newly selected tool has the same reference position as the preceding tool, so that by automatic correction, all differences between the positions of the working points of the several tools are compensated.

A substantial advantage of the invention resides in that the unavoidable displacement of the cutting edge or of the cutting point of the tool, occurring during arresting of the tools and clamping the tool carrier, can be completely disregarded. No narrow tolerances are required by abutment faces and abutment holes for the tool holders. Complicated tool supporting devices which are intended for holding the tolerances small, are consequently no longer required. The clamping means need only assure that the tool cannot be displaced by the forces occurring during cutting of a material. The working point of a tool to be set may be located in the axis of the tool, for example in a drill, but it may also be radially spaced from the tool axis, or from the respective axis of the tool holder, as is the case for a lathe cutter.

The adjustment of a tool in relation to one reference plane is sufficient, if only movement in the direction of the axis of rotation of the chuck and workpiece are to be programmed. In such a case, the tool may be a drill which irrespective of its position in relation to the axis of the workpiece, performs only working movements in axial direction. In such a case, the drill is displaced together with the tool carrier parallel to the axis of the working spindle until the cutting point, for example the transverse cutting edge at the leading end of the drill, is located in the reference plane.

The adjustment of the tool to a fixed reference line or point is necessary if a tool is concerned which performs working movements in radial direction in relation to the axis of the working spindle, as well as parallel to the axis of the spindle, which is the case for a lathe cutter. In accordance with the invention, the tool carrier moves in this case parallel to the axes of a system of rectangular coordinates whose origin is located in the reference point, and the coordinates of the displacement of the cutting point of the tool are stored. Depending on the design of the respective machine tool, it may be necessary to move the tool carrier parallel to three axes of a system of rectangular coordinates in which event the reference point must have a particular position in relation to the axis of the working spindle. Preferably, the machine tool is constructed so that for setting of the working or cutting point of the tool to the reference point, the tool carrier has to move only parallel to two axes of the system of coordinates, that is in two mutually perpendicular directions.

In accordance with the method of the invention, the setting of the tool can be carried out in such a manner that first all tools on a tool carrier or turret of the machine tool are successively set. During the following use of the tools, the setting operation can be omitted. In this method of the invention, it is necessary to carefully check the dimensions of the workpiece, since due to the continuously occurring wear of the cutting edges of the tool during cutting operations, a readjustment of the working point and a resetting of the tools may be required.

In order to prevent that between checking operations a great number of rejects is made, which may be caused by the breakage of a cutting edge of a tool, the invention provides that the machine is stopped when a predetermined distance of tool adjustment is exceeded.

In order to assure that during the cutting of the workpieces, the permissible tolerances are not exceeded, the program control is designed in accordance with the invention so that after a predetermined number of cutting operations, the respective tool is automatically again set and adjusted. In this manner, accurate workpieces can be manufactured irrespective of the wear of the tool.

In accordance with another method of the invention, the tools can be set every time before it is used. Such an arrangement causes a greater duration of the operations due to the time required for setting the tool again. However, the storage device of the program controlled means can be simplified in this case, since it is not necessary to provide for each tool separate storage units. Furthermore, the wear of the tool is automatically compensated without specific checking.

The apparatus of the invention is preferably provided with sensing means for sensing the position of the cutting point of the tool. A tool, such as a drill, may be moved in one direction perpendicular to a predetermined plane, and the sensing means produces a signal for the program controlled means when the cutting point of the drill is located in this plane.

For another type of tool, such as a lathe cutter, it is advantageous to move the tool in two perpendicular directions respectively perpendicularly to two perpendicular planes, and two sensing means are provided for sensing the position of the cutting point of the tool when the same moves in the two directions toward the planes. Both sensing means are actuated when the cutting point is located in both planes at the line of intersection of the same, and particularly in a point constituting the origin of a system of rectangular coordinates whose axes are located in the perpendicular planes, respectively.

In a preferred embodiment of the invention, two mounting means mount tool feeler plates which have engaging faces at right angles to each other. The cutting point of the tool engages and displaces one feeler plate when moving in one direction until the engagement surface is located in the plane perpendicular to the direction of movement, in which position the feeler plate causes actuation of a signal generator. When the cutting point moves in the other perpendicular direction and engages the respective other feeler plate, displacing the same, the engagement face of this feeler plate moves into the other plane, and actuates a signal generator to provide another signal stored in the program controlled means.

In order to avoid damage to the cutting point of the tool by engagement of the respective feeler plates, or damage to the engagement face of the feeler plate, the feeler plate should yield easily when engaged by the cutting points of the moving tool. It is advantageous to make each feeler plate as one arm of an angular sensing means whose other arm is supported by resilient spring joints or spring suspensions formed of leaf springs. Such a resilient mounting not only assures a movement of the displaced feeler plate in parallel relation, but they also floatingly support the feeler plates in such a manner that even a very light touch of the tool displaces the respective feeler plate in the direction of the movement of the tool.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
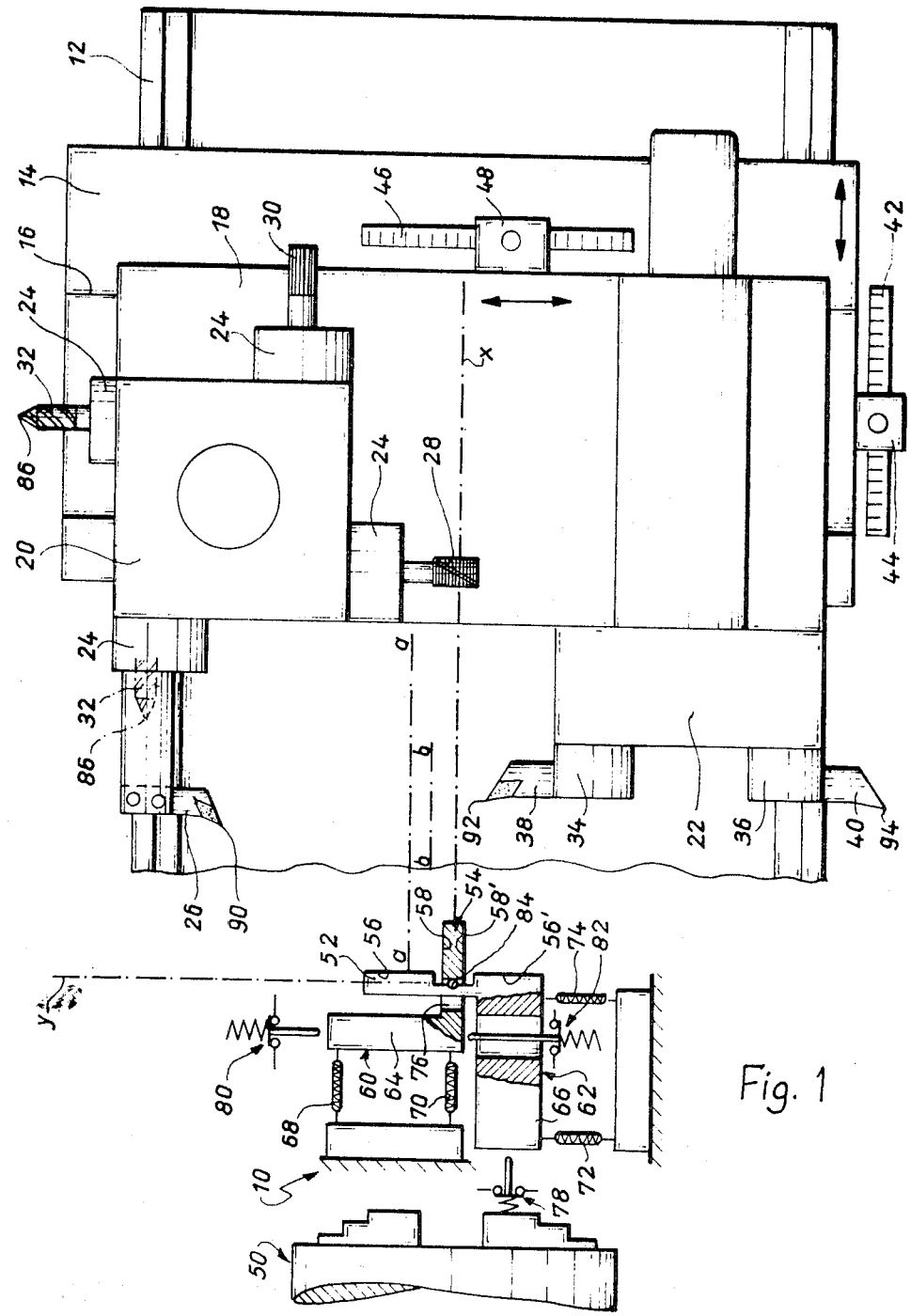
FIG. 1 is a fragmentary schematic plan view, partially broken off, and illustrating a machine tool provided with the apparatus of the invention.

The drawing shows an automatic lathe provided with a setting device 10 according to the invention. On a machine bed 12, a lower carriage 14 is mounted, and can be manually or automatically moved in the longitudinal direction indicated by the axis $x$. Transverse guide means 16 on the lower carriage 14, support an upper carriage 18 for movement in direction perpendicular to the direction of movement of the lower carriage 14, and parallel to the axis $y$ of a system of rectangular coordinates. A workpiece holder 50 in the form of a chuck is mounted on the working spindle, not shown, of the automatic lathe, and is adapted to rotate a workpiece, not shown, about the axis of the work spindle.

The upper carriage 18 is provided with two tool carriers 20 and 22 which are turrets. Turret 20 is rotatable about an axis perpendicular to the plane of the drawing, that is a vertical axis, and supports in four tool holders 24, four tools 26,28,30,32 which are spaced 90° from each other. The turret 22 is turnable about an axis parallel to the axis of the working spindle, workpiece holder 50 and of the workpiece, that is a horizontal axis, and carries on opposite sides two tool holders 34,36, each of which clamps a lathe cutter 38 and 40.

A graduated scale 42 is mounted on the machine bed 12 extending parallel to the workpiece axis, and cooperating with a sensing head 44 which is secured to the lower carriage 14. Correspondingly, a graduated scale 46 is supported by the lower carriage 18, and extending perpendicularly to the workpiece axis, in the direction of movement of the upper carriage 18, and cooperates with a sensing head 48 carried by the upper carriage 18.

Chuck 50 is separated by a working space from the tool carrier means 24,34,20,22,18 and 14, and a setting device 10 according to the invention, is temporarily located in this space during a setting operation.

In the illustrated embodiment, two angular sensing means 60 and 62 are provided. Sensing means 60 has a feeler arm formed as a feeler plate 54 having engagement faces 58, 58' on opposite sides thereof. Feeler means 62 has a feeler arm 52 formed as a feeler plate having an engagement face consisting of two face portions 56 and 56'. A reduced portion of the feeler plate 52 passes through an opening 76 in feeler plate 54. The engagement faces 56,56' are located in a common plane which is perpendicular to planes passing through engagement faces 58,58' of feeler plate 54.

The other arm 64 of the angular sensing means 60 is perpendicular to the arm 54, and the other arm 66 of the sensing means 62 is perpendicular to the feeler plate 52. Each of the arms 64,66 is supported by a pair of spring suspensions 68,70 and 72,74, respectively, which in a well-known manner consist of leaf springs. The spring suspensions 72,74 permit movements of arm 66 in parallel relation, and the spring suspensions 68,70 permit movement of arm 64 in parallel relation. Consequently, feeler plate 54 can be displaced in the direction of movement of the upper carriage 18, and feeler plate 52 can be displaced in the direction of movement of the lower carriage 14.

Since the engagement faces 58,58' of feeler plate 54 are located at opposite sides of the same, the engagement faces 56 and 58, and 56' and 58' are respectively located adjacent each other defining rectangular spaces. Feeler plate 52 is mounted in the opening 76 with sufficient play so that it can be adjusted relative to the arm 64.

The angular sensing means 62 of feeler plate 52 is associated with a signal generating switch 78 which is closed by arm 62 in a predetermined displaced position of feeler plate 52. The arm 64 of sensing means 60 is associated with two signal generating switches 80 and 82 which are closed, respectively, when feeler plate 54 is displaced in either one of two opposite directions along axes $y$ predetermined distances out of the normal illustrated position. The signal generating switches are schematically illustrated and may be inductive or capacitive signal generating means, or a conventional switch.

It is assumed that an imaginary point 84, fixed in relation to the machine bed 12, is located in the axis of rotation of chuck 50 and the workpiece, not shown. The imaginary point 84 serves as a reference point, and is assumed to be the origin of a system of rectangular coordinates whose axes are located, respectively, in two perpendicular imaginary planes $x$ and $y$.

The plane $x$ is parallel to the direction of movement of the lower carriage 14, and the plane $y$ is parallel to the direction of movement of the uper carriage 18 so that in the illustrated embodiment, the planes $x$ and $y$ intersect in a vertical reference line which intersects with the workpiece axis at the reference point 84.

The engagement faces 58 and 58' of the feeler plate 54 are parallel to the reference plane $x$, and the engagement faces 56 and 56' of feeler plate 52, are parallel to the reference plane $y$. Due to the spring suspensions, the engagement faces 56,56' remain parallel to reference plane $y$ when sensing means 62 is displaced, and engagement faces 58,58' remain parallel to the reference plane $x$ when sensing means 60 is displaced.

The signal generating means 78 and 80,82, respectively, are disposed to generate a signal when feeler plate 52 is displaced to a position in which engagement faces 56,56' are located in the plane $y$, and the signal generating means 80,82 are disposed to generate a signal when either engagement face 58 or engagement face 58' of feeler plate 54 is located in the plane $x$.

Tools 38 and 40 have cutting points 92,94. Tool 26 has a cutting point 90, and tool 32, shown to be a drill, has a cutting point in the form of a transverse cutting edge 86. Tools 28 and 30 have corresponding cutting points.

As will now be explained, the cutting point of a tool which is to be set cooperates with at least one of the feeler plates 52,54 and displaces the respective feeler plate to actuate the signal generating means.

In accordance with the invention, the initial position of a tool which is to be set and of its carriage means, is automatically measured to provide a reference value on which the program stored in the storage of program controlled means is based, and which provides a starting point for the program operations. Due to the measuring of the movement of the working point of the tools during the setting of the same, it is no longer necessary to calculate the position of the cutting edges of the workpieces when the respective turret is turned to render another tool operative. On the contrary, it is possible to calculate the program for each tool with reference to a given value, and the stored reference value permits the cutting of a workpiece to given tolerances.

Assuming that a drilling tool 32 in the turret or tool carrier 20 is to be used for a drilling operation, movements of the same relative to the machine reference point 84 are to be measured. For this purpose, data are taken from the card of a card file concerning this drilling tool 32, and the measurements indicating the required adjusting movements of this tool out of the initial position are programmed in such a manner that the cutting point 86, represented by the transverse cutting edge at the leading end of the drill, is moved by the upper carriage 18 automatically to a position located in the plane $a—a$. When the cutting point 86 is in this position, the lower carriage 14, together with the upper carriage 18, the tool carriers and the tools, is moved in accordance with the prepared program toward the setting device 10. During this movement parallel to the plane $x$, the cutting point 86 engages the engagement face 56 of the feeler plate 52 and displaces the same to a predetermined position in which the engagement face 56 and consequently the cutting point 86 are located in the reference plane $y$. The displacement of feeler plate 52 displaces also the arm 66 of sensing means 62 so that the signal generator 78 is actuated to generate a signal which effects the storing of the distance read out on graduated scale 42 by read-out head 44 in the form of a reference value representing the distance from the initial position to the plane $y$. This means that the programmed working movement of drill 32 for drilling a hole in the workpiece after removal of the device 10 from the working space, will take place in the direction of the axis of the workpiece, and will cover a distance determined by the reference value stored in the program controlled means.

When the required movements of the cutting point 90 of a lathe cutter 26 are to be measured, the tool carrier means 14,18,20,24 are operated in a setting movement in accordance with the information contained in the respective file card of the tool 26. In accordance with the measurements required for setting the tool 26, carriage 14 and 18 are automatically operated under program control so that the cutting point 90 enters the region of the engagement faces 56 and 58. In accordance with the program, the cutting point 90 is first moved into a plane $b-b$ which is parallel to the reference plane $x$. When cutting point 90 is located in the plane $b-b$ it is in a position in which it will not engage feeler plate 54 when moving parallel to engagement face 56 and plane $y$. Consequently, when cutting point 90 is located in the plane $b-b$, carriage 14 is operated parallel to the plane $x$ until the cutting point 90 is located in the reference plane $y$ and has displaced feeler plate 52 to a position in which engagement face 56 is located in the reference plane $y$, so that signal generator 78 is actuated, and generates a signal which stores the distance measured by sensing head 44 and graduated scale 42 at this moment.

Thereupon the tool 26 with cutting point 90 is moved by the upper carriage 18 until the cutting point 90 engages feeler plate 54 and displaces the same to a position in which the engagement face 58 engaged by cutting point 90 is located in the reference plane $x$, causing actuation of the signal generator 82 which produces a signal causing a reading out and storing of the entire distance which cutting point 90 has moved parallel to the reference plane $y$, so that the two signals have stored the line of intersection of planes $x$ and $y$ at the reference line and the respective actual distances from the initial position of the cutting point 90, and more particularly, since all movements took place in a horizontal plane, have stored the distances from the initial position to the reference point 84 located in the axis of the chuck 50.

In the above-described manner, the tools 38 and 40 of the turret 22 can also be fed by moving under the control of a program taken from the file cards toward the engagement faces 56', 58', and together with the feeler plate 52 and 54 into the line of intersection of the reference planes $x$ and $y$.

In the above-described apparatus, a horizontal plane through the axis of the work spindle intersects the planes $x$ and $y$ along the perpendicular axes of a system of rectangular coordinates, and the movements along the graduated scale 46 can be stored with reference to the axis of the system located in the plane $y$, while the movements in the direction of the graduated scale 42 can be stored with reference to the axis of the system located in the plane $x$.

Figure 2:
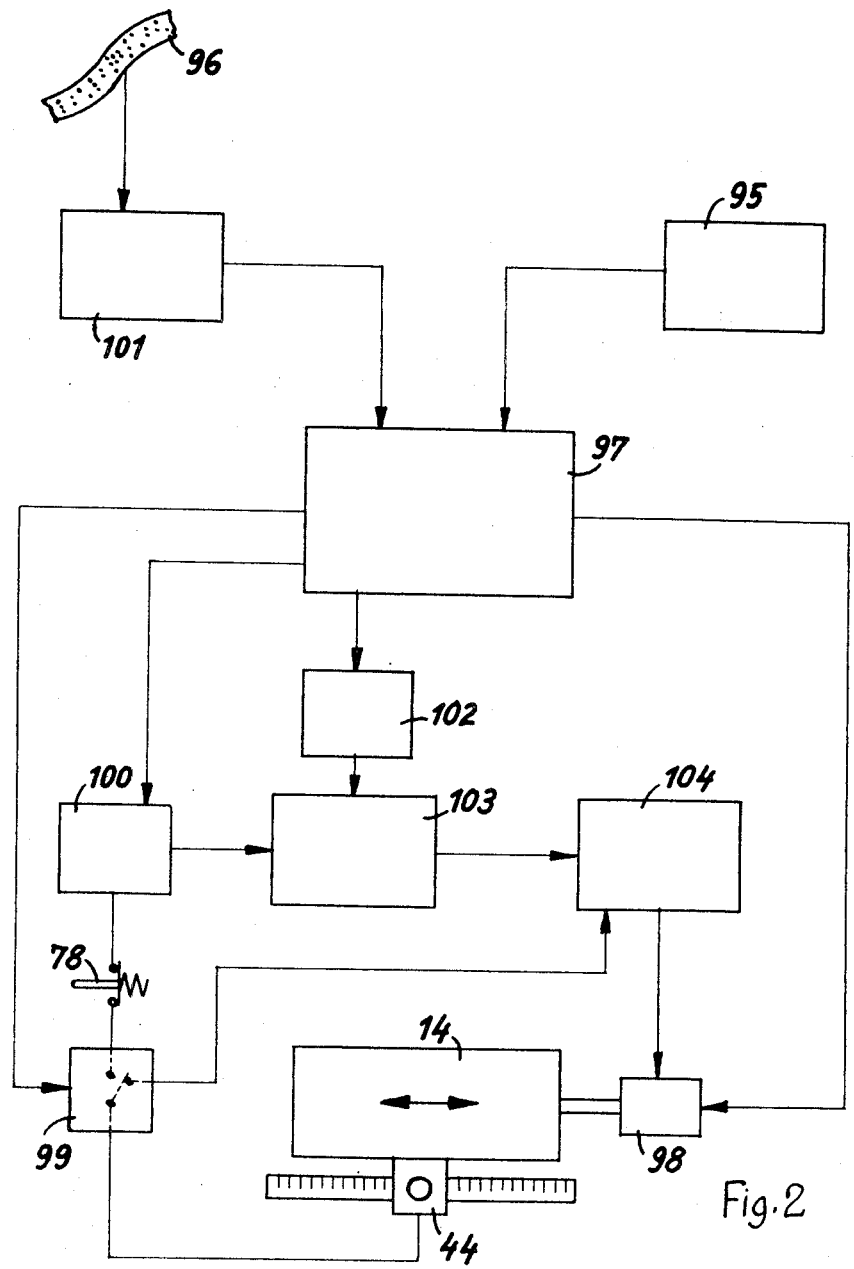
FIG. 2 is a schematic diagram illustrating the electric circuit of the program control means of the apparatus.

The operations under the control of program control means will be best understood with reference to FIG. 2.

The start of the setting operations takes place either by operating a manual input 95 or automatically under the control of a record carrier 96 in the form of a punched tape. The computer 97 then issues a command signal to operating means 98 which moves carriage 14. At the same time, the distance read out by the sensing head is entered into the storage 100 through a switch 99 and signal generator switch 78. The value stored in storage 100 is varied in accordance with the distance sensed by sensing head 44.

The connection of storage 100 with the sensing head 44 is interrupted at the moment at which a tool engages the surface 56 of feeler plate 52 and displaces the same so that signal generator switch 78 opens whereby the distance which was read out into the storage 100 at this moment is stored. If the storage 100 is to be used for an other tool, the value stored is cancelled by computer 97. The setting movement of carriage 14 is then stopped by a signal from signal generator switch 78.

During automatic operations taking place in accordance with the program recorded on program control tape 96, the read-out devices receive a pulse which is decided in computer 97 and transmitted to the position storage 102. The values stored at this time in storage 100 and in position storage 102 are combined in an adder 103 and transmitted as a desired value to the comparison device 104 where the desired value is compared with the actual value of the position.

Upon a program signal, the switch 99 is shifted by computer 97 so that sensing head 44 is connected with the comparison device 104 which continues to transmit a signal to operating means 98 until the actual distance read out by sensing head 44 is the same as the desired distance of movement of the carriage 14.

The setting movements of the tools in the preliminary above-described operation, and in accordance with the information found in the files of the respective tools, can be carried out by high-speed movements of the tools. A running over beyond the reference planes $x,y$ is immaterial, since the actual distances are exactly stored in the storage device by electrical signals. No mechanical damage can be caused by tools overrunning the reference position, since the feeler plates are resiliently mounted on spring suspensions.

During the preliminary setting movements of the tool, the operator of the machine can prepare the program for the next tool in accordance with a file card, and ascertain the required position number on the tool carrier. This work has to be carefully done, and requires a certain amount of time during which the automatic setting of the tool in relation to the reference point can be carried out, so that no time is lost.

Since the space between chuck 50 and the tools is required for the workpiece during the cutting of the same, the setting device 10 is mounted in such a manner on the supporting frame of the automatic lathe that after a preliminary setting operation of the work tool, the device can be removed and either manually or automatically tilted or shifted to an inoperative position located outside of the working space and leaving the same free for the cutting operation. It is also possible to mount the device 10 outside of the working space, so that a removal after the setting of the tool is no longer necessary. The origin of the system of coordinates, and the reference point 84 are then no longer located in the axis of the working spindle and chuck 50, and this requires a correction of the program in accordance with a constant which is valid for the particular apparatus.

The setting movements of the tools can be expressed in the measuring system incremental, analog, or absolute. The machine may be provided with another measuring system for controlling machine operations, for example, turn indicators on the spindles driving the carriages, or impulse generators driven by a rack and pinion drive can be used. Stepping motors can also be used for this purpose. It is advantageous to use existant distance measuring devices used for controlling the shafts of the machine, also for measuring the distances of displacement of the tools during the setting operations.

It will be understood that each of the elements described above, or two or more together, may also find a useful application in other types of program controlled setting arrangements for a machine tool differing from the types described above.

While the invention has been illustrated and described as embodied in an arrangement for determining the reference point for program controlled operational movements of a tool of an automatic lathe, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Method for setting at least one tool mounted on a program controlled carrier means of a machine tool, comprising moving said carrier means out of an initial position in a setting movement for positioning a cutting point of a tool in at least one predetermined reference plane which has a fixed position relative to said machine tool and to a workpiece holder of the same; continuously measuring the distance which said carrier means and said tool move in at least one direction; sensing the position of said cutting point of said tool when the same approaches said reference plane; generating, when said cutting point is located in said plane, a signal for storing in said program control means data representing the measured distance from said initial position to said reference plane; and moving said carrier means with said tool in a working movement to operate said workpiece in accordance with a program based on said stored data which represents the actual distance between said reference plane and said initial position as a reference value.

2. The method of claim 1 comprising moving said carrier means for positioning the cutting point at the line of intersection of two predetermined planes extending at right angles to each other; and wherein the program for operating on the work piece is based on stored data which represent the position of said line of intersection as a reference value.

3. The method of claim 1 comprising moving said carrier means automatically in at least one direction toward said plane; automatically measuring the distance of movement in said direction; and generating a reference signal for said program control for storing the distance when said cutting point is located in said predetermined plane.

4. The method of claim 1 comprising moving said carrier means in said setting movement for moving said cutting point at least in one direction which is parallel to the axis of rotation of the workpiece; and wherein said plane is perpendicular to said axis.

5. The method of claim 1 comprising moving said carrier means in two perpendicular directions of a system of coordinates for positioning the cutting point at the line of intersection of two predetermined planes extending at right angles to each other in the directions of the coordinates of said system so that the origin of said system is located in said line of intersection.

6. The method of claim 1 comprising stopping of the machine tool when said tool has moved with said carrier means a distance exceeding a predetermined distance.

7. The method of claim 1 wherein said setting movement is carried out before each working movement.

8. The method of claim 1 wherein said setting movement is repeated after a selected number of successive working movements with the same tool.

9. Apparatus for setting at least one tool of a machine tool, comprising program control means; tool carrier means controlled by said program control means to move a tool out of an initial position in a setting operation in at least one direction perpendicular to a reference plane means for measuring the distance which said tool carrier means and said tool move at least in said one direction, and for continuously storing the distance in said program control means; sensing means sensing the position of a cutting point of said tool when the same approaches said plane, and being actuated when said cutting point is in said plane; and signal generating means operated by said sensing means when the same is actuated to generate a signal indicating the measured and stored distance from said initial position to said reference plane whereby working movements of said carrier means with said tool for operating on a workpiece can be program controlled with reference to the actual distance between said plane and said initial position.

10. Apparatus for setting at least one tool of a machine tool, comprising program control means; tool carrier means controlled by said program control means to move a tool out of an initial position in a setting operation in two perpendicular directions respectively perpendicular to two perpendicular reference planes; two means for measuring the distances which said tool carrier means and said tool move in said directions, and for continuously storing the distances in said program control means; two sensing means for sensing the position of a cutting point of said tool when the same moves in said two directions toward said planes, respectively, and being both actuated when the cutting point is located in both said planes at the line of intersection of the same; and two signal generating means operated by said two sensing means, respectively, when the same are actuated to generate two signals indicating the measured and stored distances from said initial position in said directions to said reference planes, respectively, whereby working movements of said carrier means with said tool for operating on a workpiece can be program controlled with reference to the actual distances between said planes and said initial position.

11. The apparatus of claim 10 comprising two mounting means for mounting said two sensing means, respectively, for movement in said directions; and wherein said sensing means are engaged and displaced, respectively, in said two directions beyond said reference planes, respectively, by the cutting point of the tool; and wherein said signal generating means are operated by said two sensing means, respectively, when the same are displaced to predetermined positions by the cutting point when the same is located at the line of intersection of said two planes, respectively during movement with said sensing means beyond said reference planes.

12. The apparatus of claim 11 wherein said two sensing means include feeler plates, respectively; wherein said mounting means mount said feeler plates for movement in said directions, respectively; and wherein each of said feeler plates has at least one engagement face which is engaged by said cutting point moving in the respective direction so that the respective feeler plate is placed in said predetermined position in which said face is located in the respective plane and then moved by said tool beyond said predetermined position.

13. The apparatus of claim 12 wherein each of said two sensing means is angular and has a first arm forming said feeler plate, and a second arm supported by said mounting means for movement in parallel relation.

14. The apparatus of claim 13 wherein each of said mounting means comprises a plurality of spaced spring suspensions including leaf springs.

15. The apparatus of claim 14 wherein said first arm of one of said sensing means has an opening therethrough; and wherein said first arm of the other sensing means passes through said opening so that plate portions of said first arm of said other sensing means are located on opposite sides of said feeler plate of said one sensing means and have aligned engagement faces parallel to one of said planes; and wherein said feeler plate of said one sensing means has engagement faces on opposite sides thereof parallel to the other plane and to each other.

16. The apparatus of claim 10 wherein said machine tool includes a workpiece holder rotatable about an axis; wherein said line of intersection crosses said axis at right angles; and wherein the origin of a rectangular system of coordinates extending in said directions is located at the point of intersection of said line of intersection with said axis and in a reference point for the program control means.

17. The apparatus of claim 10 wherein said machine tool includes a workpiece holder separated by a working space from said tool carrier means and said tool; and wherein said sensing means and signal generating means form a unit mounted for movement between an inoperative position, and an operative position located in said space.

18. The apparatus of claim 10 wherein said machine tool includes a workpiece holder separated by a working space from said tool carrier means and said tool; and wherein said line of intersection is located outside of said working space.

19. The apparatus of claim 10 wherein said tool carrier means include two carriages movable in said two perpendicular directions, respectively; wherein each of said two measuring means includes a graduated scale and a read-out head for the respective scale for storing read-out distances in the program control means; and wherein said graduated scales indicate measurements along coordinates of a system of rectangular coordinates having its origin in said line of intersection.

20. Apparatus for setting at least one tool of a machine tool, comprising program control means; two carrier means controlled by said program control means to move a tool in a setting operation in two perpendicular directions respectively perpendicular to two perpendicular reference planes; two means for measuring the distances which said tool carrier means and said tool move in said directions, and for continuously storing the distances in said program control means; two sensing means for sensing the position of a cutting point of said tool when the same moves in said two directions toward said planes, respectively, and being both actuated when the cutting point is located in both said planes at the line of intersection of the same, each of said sensing means being angular and having a first arm forming a feeler plate and a second arm; two mounting means for mounting said two sensing means, respectively, for movement in said directions and supporting said second arm for movement in parallel relation, each of said feeler plates having at least one engagement face which is engaged by the cutting point of said tool moving in the respective direction so that the respective feeler plate is placed in said predetermined position in which said face is located in the respective plane, said mounting means comprising a plurality of spaced spring suspensions including leaf springs; said first arm of one of said sensing means having an opening therethrough, and said first arm of the other sensing means passing through said opening so that plate portions of said first arm of said other sensing means are located on opposite sides of said feeler plate of said one sensing means and have aligned engagement faces parallel to one of said planes, said feeler plate of said one sensing means having engagement faces on opposite sides thereof parallel to the other plane and to each other; and two signal generating means operated by said two sensing means, respectively, when the same are actuated to generate two signals indicating the measured and stored distances in said directions to said reference planes, respectively, whereby working movements of said carrier means with said tool for operating on a workpiece can be program controlled with reference to said line of intersection.

* * * * *